United States Patent [19]

Poshimura

[11] 3,735,054

[45] May 22, 1973

[54] TAPE RECORDER-OPERATING DEVICE WITH AUTOMATIC EXCHANGE FROM REWIND OR QUICK FEED TO REPRODUCTION BY SENSING NONRECORDED SECTION

[75] Inventor: Kazuo Poshimura, Fuji, Japan

[73] Assignee: Tokyo Shibaura Electric Co., Ltd., Kawasaki-shi, Japan

[22] Filed: July 6, 1971

[21] Appl. No.: 159,670

[30] Foreign Application Priority Data

July 6, 1970 Japan ................................45/58537

[52] U.S. Cl. .....179/100.2 S, 179/100.1 VC, 274/4 D

[51] Int. Cl. .........................G11b 15/44, G11b 27/28

[58] Field of Search .................179/100.2 R, 100.2 S, 179/100.2 Z, 100.1 VC; 274/4 C, 4 D; 242/55.19, 197; 226/49, 51, 178, 188

[56] References Cited

UNITED STATES PATENTS

| | | | |
|---|---|---|---|
| 3,624,308 | 11/1971 | Kozu | 179/100.2 S |
| 3,454,731 | 7/1969 | Hori et al. | 179/100.2 S |
| 2,535,498 | 12/1950 | Kornei | 179/100.2 R |
| 3,305,240 | 2/1967 | Missriegler | 279/100.2 S |
| 3,355,557 | 11/1967 | Laa et al | 179/100.2 S |

*Primary Examiner*—Bernard Konick
*Assistant Examiner*—Alfred H. Eddleman
*Attorney*—Kemon, Palmer & Estabrook

[57] ABSTRACT

A tape recorder-operating device, wherein a sound reproducing lever for bringing a drive mechanism to a sound reproducing state is coupled by a connecting member with a quick feed lever for bringing said drive mechanism to a quick feed state so as to be jointly operated with the latter lever; a first lock plate for locking the sound reproducing lever to an operable state and a second lock plate disposed above said first lock plate substantially in parallel relationship so as to lock the quick feed lever to an operable state are so supported as to face both levers respectively; the first and second lock plates interlock each other only when the operations of both sound reproducing and quick feed levers are locked or released at the same time; there are provided detachable projections so as to cause the second lock plate alone to be actuated only when the operation of the quick feed lever is locked or released; and there is further provided plunger means for actuating the second lock plate so as to release the lock of the quick feed lever alone upon detection of a nonrecorded portion of the tape.

3 Claims, 4 Drawing Figures

INVENTOR
KAZUO YOSHIMURA
BY
Kemon, Palmer & Estabrook
Attorneys

INVENTOR.
KAZUO YOSHIMURA
BY
Kemon, Palmer & Estabrook
Attorneys

TAPE RECORDER-OPERATING DEVICE WITH AUTOMATIC EXCHANGE FROM REWIND OR QUICK FEED TO REPRODUCTION BY SENSING NONRECORDED SECTION

BACKGROUND OF THE INVENTION

This invention relates to a tape recorder-operating device capable of successively reproducing several tunes already recorded on a tape by a one-touch operation and more particularly to a tape recorder-operating device which permits automatic switching from the quick feed to the sound reproducing state of the tape.

With a casette tape recorder used with, for example, an automobile, there are occasions where it is desired to reproduce from the start the preferred one of several popular tunes recorded on the tape by quick feeding those portions thereof where there are recorded undesired tunes. In such case, the tape recorder user had to find out the initial portion of a desired tune from among those recorded on the tape by unnecessarily listening to some other tunes by the quick feed, reproduction or rewind of the tape with the corresponding push button depressed each time. However, the prior art tape recorder-operating device was accompanied with the drawbacks that the quick feed or rewind of the tape was often carried to excess, the tape stopped travelling before the initial recorded portion of a desired tune could be found and, as described above, different push buttons had to be depressed many times until the discovery of a preferred tune, thus resulting in a considerably complicated operation.

SUMMARY OF THE INVENTION

It is accordingly the object of this invention to provide a tape recorder-operating device capable of locking the quick feed or rewind and the reproduction of the tape in interlocking relationship, releasing the lock of only the quick feed or rewind upon detection of a nonrecorded portion between adjacent tunes recorded on a tape and automatically switching from the quick feed or rewind to the reproduction of the tape.

The above-mentioned object is attained by coupling the reproduction lever with the quick feed and rewind levers by a connecting member so as to be operated jointly with the latter lever; arranging in parallel a first lock plate having hook portions to lock the operation of the reproduction lever and a second lock plate having hook portions to lock the operation of the quick feed and rewind levers so as to cause the projections formed on both lock plates to freely engage each other; simultaneously locking the operation of the quick feed or rewind lever and that of the reproduction lever; and actuating plunger means upon detection of a nonrecorded section of the tape so as to release the lock of the operation of the quick feed or rewind lever alone and permit automatic switching to the reproduction of the tape.

DESCRIPTION OF THE INVENTION

Figure 1:
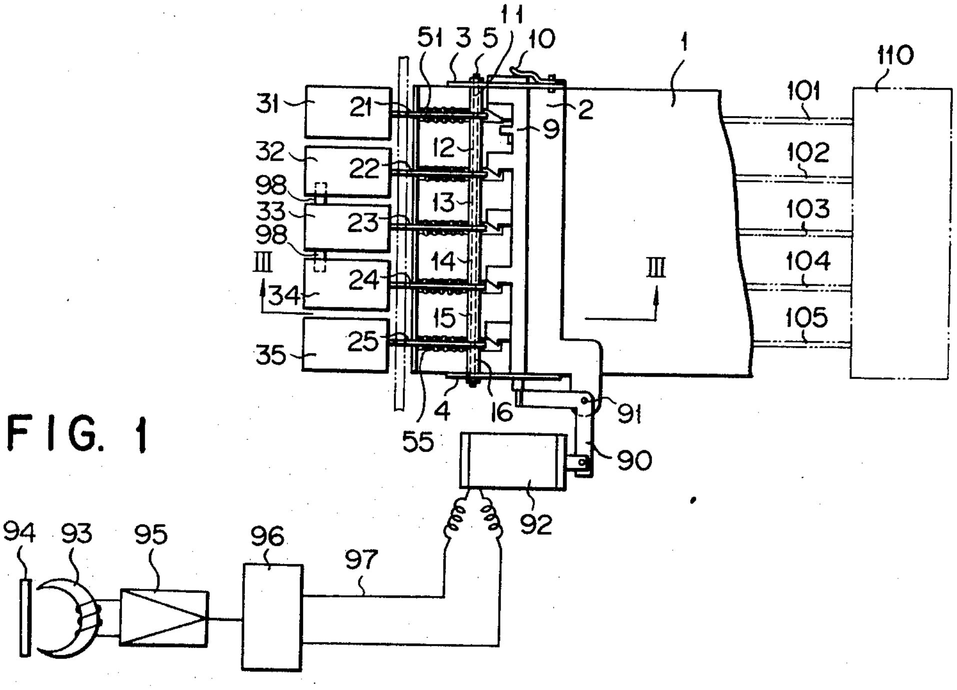
FIG. 1 is a plan view of a tape recorder-operating device according to this invention.
Figure 2:
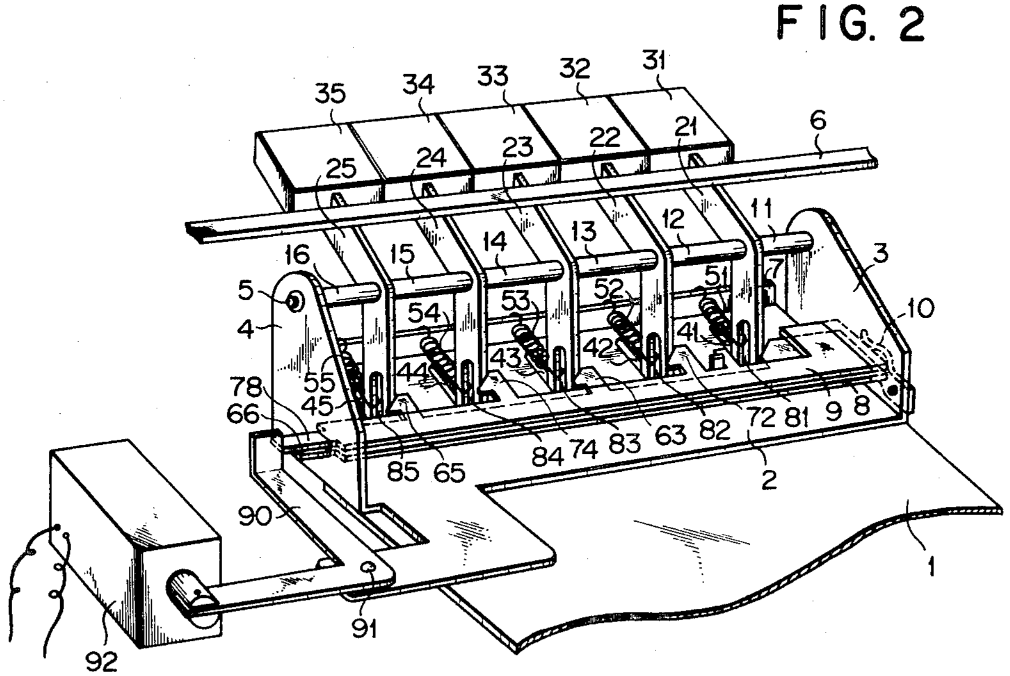
FIG. 2 is a perspective view of the main mechanism of the invention.
Figure 4:
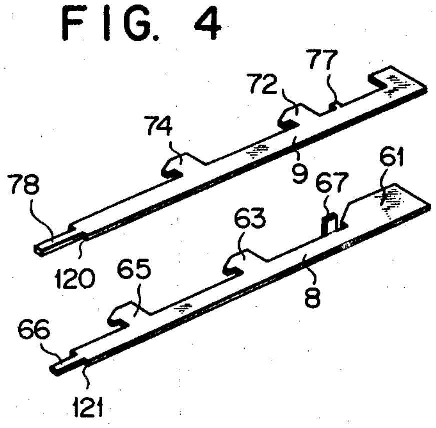
FIG. 4 presents the shapes of lock plates used in the invention.

These will now be described this invention by reference to the appended drawings. As shown in FIGS. 1 and 2, there is mounted a frame 2 on a substrate 1. Said frame 2 has a pair of side frames 3 and 4 erected at both ends. Between said erected side frames 3 and 4 is supported a shaft 5, to which are rotatably fitted substantially at an equal space through spaces 11, 12, 13, 14, 15 and 16 the bent portions of a stop lever 21, rewind lever 22, reproduction lever 23, quick feed lever 24 and recording lever 25 all formed into a substantial L-shape. To the outer ends of these levers are attached push buttons 31, 32, 33, 34 and 35. The inner ends of the levers are movably inserted into notches 41, 42, 43, 44 and 45 corresponding to the levers formed in the frame 2 in such a manner as to project to the underside of said frame 2. Across the one side portion of the levers is stretched a common stopper 6 so as to maintain the levers at a prescribed position when they are not operated. Across the other side portions of the levers and the erected side plate 7 of the frame 2 are streched springs 51, 52, 53, 54 and 55 in a number corresponding to said levers. These springs normally urge said other side portions of the levers toward said erected side plate 7. There are provided two lock plates 8 and 9 shaped as shown in FIG. 4 close to said other side portions of the levers and substantially parallel with the upper surface of the frame 2. The first lock plate 8 has hook portions 63 and 65 so formed as to face the reproduction lever 23 and record lever 25, and also a projection 61 so formed as to face the stop lever 21 for release of said first lock plate 8. At the opposite end thereof to said projection 61 is formed a narrow strip 66. Further between the aforesaid projection 61 and the hook portion 63 is disposed an upward projection stop member 67.

The second lock plate 9 faces the rewind lever 22 and the quick feed lever 24, and has hook portions 72 and 74 and also a horizontally projecting member 77 to engage the stop member 67 of the first lock plate 8, thereby causing the second lock plate 9 to be jointly operated with the first lock plate 8. Said horizontally projecting member 77 of the second lock plate 9 is sufficiently spaced from the hook portion 72 to cause the second lock plate 9 to be moved for release of its lock while the first lock plate 8 stands at rest. At one end of the second lock plate 9 is formed a narrow support end strip 78 which is urged by the later described plunger.

The first and second lock plates 8 and 9 are disposed one above the other in substantially parallel relationship and have both ends thereof inserted into the mutually facing upright side frames 3 and 4 so as to slide lengthwise. The shoulders 120 and 121 of the first and second lock plates 8 and 9 act as stoppers on the upright side frame 4 with respect to the left sides of said plates as indicated. These plates 8 and 9 are secured on the upright side frame 4 with the narrow support strips 66 and 78 inserted into the holes formed in said frame 4. The hook portions 72, 63, 74 and 65 and lock releasing projection 61 have inclined sides formed at such positions as bearing against the levers 21, 22, 23, 24 and 25, thereby causing the hook portions to be fitted into the elongate holes 81, 82, 83, 84 and 85 of the corresponding levers when they are operated for locking.

One end of the first and second lock plates 8 and 9 respectively inserted into the upright side frames 3 and 4 is urged inward by a plate spring 10 (FIG. 1), and the other end, that is, the narrow support strip 78 of only the second lock plate 9 is pressed against one end of a substantially L-shaped rotatable lever 90, whose bent portion 91 is rotatably supported on part of the frame 2, the other end of said L-shaped lever being coupled with the plunger 92. This plunger 92 rotates the lever 90 upon detection of a nonrecorded portion of a magnetic tape to urge the narrow support strip 78 of the second lock plate 9 for release of lock.

A magnetic head 93 is disposed, as shown in FIG. 1, close to a magnetic tape 94. The detected output from the magnetic head 93 is controlled by a control circuit 96 through an amplifier 95 and conducted to the plunger 92 so as to actuate the rotatable lever 90.

Figure 3:
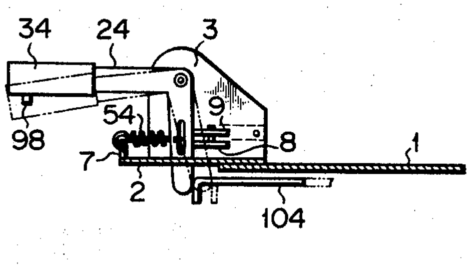
FIG. 3 is a sectional view on line III—III of FIG. 1 viewed in the direction of the arrow.

The ends of the levers 21, 22, 23, 24 and 25 which project to the underside of the frame 2 bear against the corresponding actuating plates 101, 102, 103, 104, 105 (shown in FIG. 3, for example, by an actuating plate 104 corresponding to a quick feed lever 34). When the push buttons corresponding to the actuating plates are depressed to rotate the levers 21, 22, 23, 24 and 25, the drive mechanism 110 connected to said actuating plates is brought to an operable state corresponding to said levers.

To the underside of the push button 33 is fitted a lever interlocking rod 98 extending to the undersides of the adjacent right and left push buttons 32 and 34. Attachment of said rod 98 enables the push button 33 of the reproduction lever 23 to be also actuated upon depression of the push button 32, permitting the simultaneous operation of the rewind lever 22 and reproduction lever 23. Similarly, when the push button 34 of the quick feed lever 24 is depressed, the push button 33 is jointly depressed, enabling the quick feed lever 24 and reproduction lever 23 to be operated at the same time.

There will now be described an embodiment of this invention arranged as described above, that is, the case where the unnecessary tune of a magnetic tape containing several tunes are subjected to quick feed to reproduce from the start a given tune following any of the nonrecorded sections, more particularly the case where a tape recorder user who is assumed to know in advance the sequence of the recorded tunes desires to reproduce a preferred one from among said tunes by quickly feeding unnecessary pieces. In such case, the user first depresses the push button 34 of the quick feed lever 24 during reproduction of unnecessary tunes. At this time, the reproduction lever 23 is also depressed surely by the rod 98. The push button 33 of the reproduction lever 23 may be independtly operated. Depression of both quick feed and reproduction levers 24 and 23 operates the corresponding actuating plates 104 and 103 to drive the drive means 110 of FIG. 1, enabling the undesired tunes of the magnetic tape to be brought to a quick feed state, while a preferred piece of music is kept in a state ready to be reproduced. This condition is maintained by urging the inclined side of the hook portion 74 formed on the second lock plate 9 contacted by the quick feed lever 24 so as to cause said inclined side to slide into the elongate hole 84 formed in the lower half portion of quick feed lever 24 and also by urging the inclined side of the hook portion 63 formed on the first lock plate 8 contacted by the reproduction lever 23 so as to cause said inclined side to slide into the elongate hole 83 formed in the lower half portion of the reproduction lever 23. When the quick feed advances under such condition and the magnetic head 93 detects a nonrecorded section between adjacent tunes, the detected output signal is supplied to the plunger 92 through the amplifier 95 and control circuit 96. Operation of said plunger 92 actuates the rotatable lever 90 to urge the end strip 78 of the second lock plate 9 for its lengthwise slide. As a result, the hook portion 74 is disengaged from the elongate hole 84 to cause the quick feed lever 24 to be brought back to its original position by the spring 54. Since the reproducible condition is still maintained, a desired tune can be smoothly reproduced from the start as the tape further travels.

The foregoing description holds true with the case where a desired tune is to be reproduced from the start by the rewind of a tape. When the push button 32 of the rewind lever 22 is depressed, the reproduction lever 23 is jointly actuated by means of the rod 98. Thus, while the reproducible condition is maintained, the tape is rewound to detect the end of a tune or a nonrecorded section, thereby releasing only the lock of the operating condition of the rewind lever 22. Said lock releasing step is performed in the same manner as previously described.

The stop of a tape travel is effected by depressing the push button 31, causing the inclined side of the projection 61 of the first lock plate 8 to slide for the movement of the first lock plate 8, and releasing all the locked hook portions so as to bring the levers back to their original positions. At this time, the projection 77 of the second lock plate 9 engages the stop member 67 of the first lock plate 8 so as to cause the second lock plate 9 to be also shifted for the release of all the locked hook portions. As a result, the levers locked up to this point are brought back to their original positions by the pull force of the springs fully to stop the tape travel.

As mentioned above, this invention provides a tape recorder-operating device which enables simply by one touch desired tunes to be smoothly reproduced in succession.

What is claimed is:

1. A tape recorder operating device comprising:

a driving mechanism for controlling movement of a recording tape, a plurality of L-shaped levers rotatably supported at their bent portions on a common bar, each L-shaped lever having a notched portion at one end thereof, one of said L-shaped levers having an interlocking member secured to the underside thereof, said interlocking member projecting outwardly of said L-shaped lever and arranged to underly the L-shaped levers on adjacent sides of said L-shaped lever, a plurality of actuating plates, each of said L-shaped levers having an actuating plate associated therewith with an end of each L-shaped lever engaging an end of an actuating plate, the other end of each actuating plate being connected with said driving mechanism to effect a driving operation responding to the movement of each of said L-shaped levers, a first lock plate provided with a hook portion and an engaging tip portion arranged in spaced relation to one another, said hook portion engaging the notched portion of one of said L-shaped levers, a second lock plate provided with a pair of hook portions and a projecting portion arranged in spaced relation to one another, each of said hook portions engaging the notched portion of one of said L-shaped levers with said projecting portion engaging said tip portion of said first lock plate, a rotatable lever means engagable with at least one of said lock plates to permit said lock plates to become engaged with or disengaged from the notched portions of said L-shaped levers, a plunger means for actuating said rotatable lever means, and a magnetic head means for driving said plunger means to detect non-recorded portions of said recording tape.

2. The tape recorder-operating device according to claim 1 further comprising a plurality of springs stretched between one end of each lever and one side of a tape recorder frame so as normally to render the lever inoperative.

3. A tape recorder operating device according to claim 1 wherein said one of said L-shaped levers consists of a reproduction lever with a rewind L-shaped lever and a quick feed L-shaped lever overlying the interlocking member.

* * * * *

UNITED STATES PATENT OFFICE

CERTIFICATE OF CORRECTION

Patent No. 3,735,054 Dated May 22, 1973

Inventor(s) Kazuo Yoshimura

It is certified that error appears in the above-identified patent and that said Letters Patent are hereby corrected as shown below:

[75.] Inventor: Kazuo Yoshimura

Signed and sealed this 25th day of December 1973.

(SEAL)
Attest:

EDWARD M. FLETCHER, JR.
Attesting Officer

RENE D. TEGTMEYER
Acting Commissioner of Patents

USCOMM-DC 60376-P69
★ U.S. GOVERNMENT PRINTING OFFICE : 1969 O—366-334.